June 3, 1969 M. H. RHODES 3,448,297

ANALOG MULTIPLIER

Filed Sept. 6, 1966

INVENTOR.
MELVIN H. RHODES

BY

Moody & Anderson
AGENTS

United States Patent Office 3,448,297

Patented June 3, 1969

3,448,297

ANALOG MULTIPLIER

Melvin H. Rhodes, Cedar Rapids, Iowa, assignor to Collins Radio Company, Cedar Rapids, Iowa, a corporation of Iowa Filed Sept. 6, 1966, Ser. No. 577,444

Int. Cl. G06g 7/16

U.S. Cl. 307—229 11 Claims

Figures 1, 2:
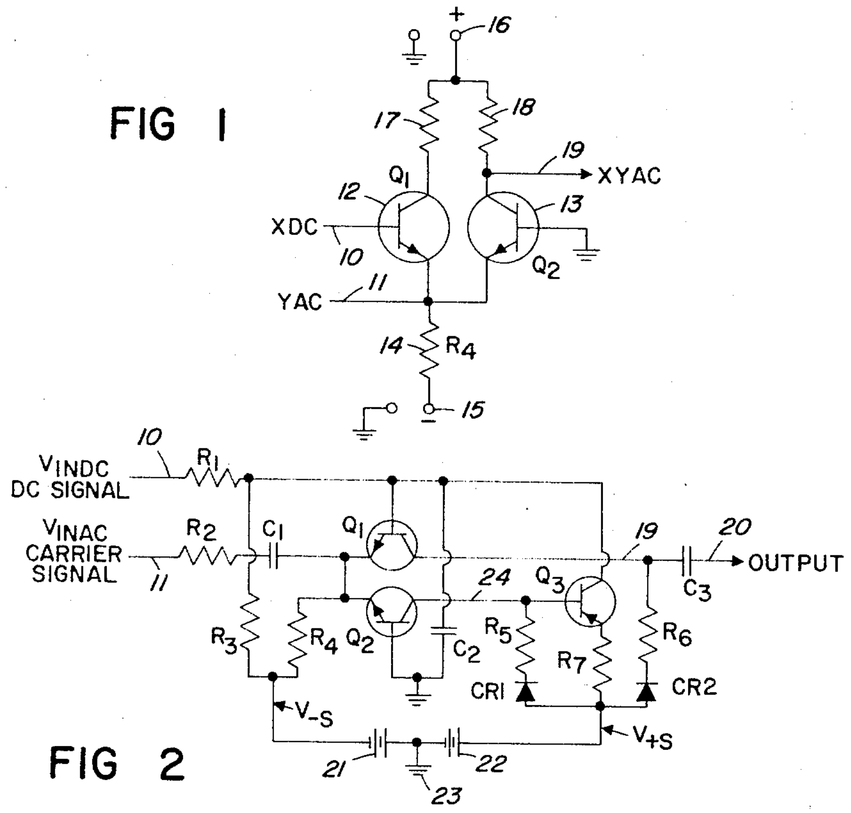

This invention relates generally to electronic circuitry which derives the product of two electrical signals and more particularly to an analog multiplier by means of which the product of two electrical input signals may be developed, one input signal being a phase and magnitude carrier signal and the other a direct current or low frequency signal. The output product comprises a carrier signal with phase determined by the input carrier and magnitude determined by the input direct current signal.

The multiplier of the present invention provides a circuitry by means of which the gain of an alternating current or carrier amplifier may be adjusted electronically in a manner analogous to the variation of a potentiometer in the input circuit of a carrier amplifier.

Applications for analog multipliers of the type to be herein described are numerous. The circuitry lends itself to automatic gain control implementations, signal fading applications, automatic control of carrier signal amplitude, as well as in numerous occasions wherein the product of an alternating current or carrier current signal and a direct current or slowly varying signal is desired. One such latter application is incorporated in an autopilot control circuitry in which an analog computation requires a linear multiplication of two input signal parameters one of which is a direct current signal and the other of which is a carrier signal.

Analog multipliers are known in the art which perform a basic multiplication of A.C. and D.C. input signals. Known circuitries of this type perform the multiplication in a non-linear logarithmic manner.

Accordingly, an object of the present invention is the provision of an analog multiplier for performing a multiplication of an input A.C. or carrier signal and an input D.C. or slowly varying signal in a linear manner, such that the circuit may function as a true analog of a multiplying function.

A further object of the present invention is the provision of an analog multiplier capable of linearly multiplying an input D.C. signal of a given polarity and predetermined variable magnitude with an input carrier or A.C. signal.

A still further object of the present invention is to provide a linear analog multiplier capable of multiplying a variable magnitude input D.C. signal of either polarity with an input carrier signal.

The present invention is featured in the utilization of two common base transistor amplifiers the emitters of which are connected to a constant current source and a carrier signal input current source. Means are provided for controlling the ratio of the transistor bias currents from an input D.C. signal source. A D.C. current feedback arrangement is employed between the two common base amplifiers to attain an output taken from the common base amplifiers which is linearly proportional to the product of the input direct current and carrier signals.

Figure 3:
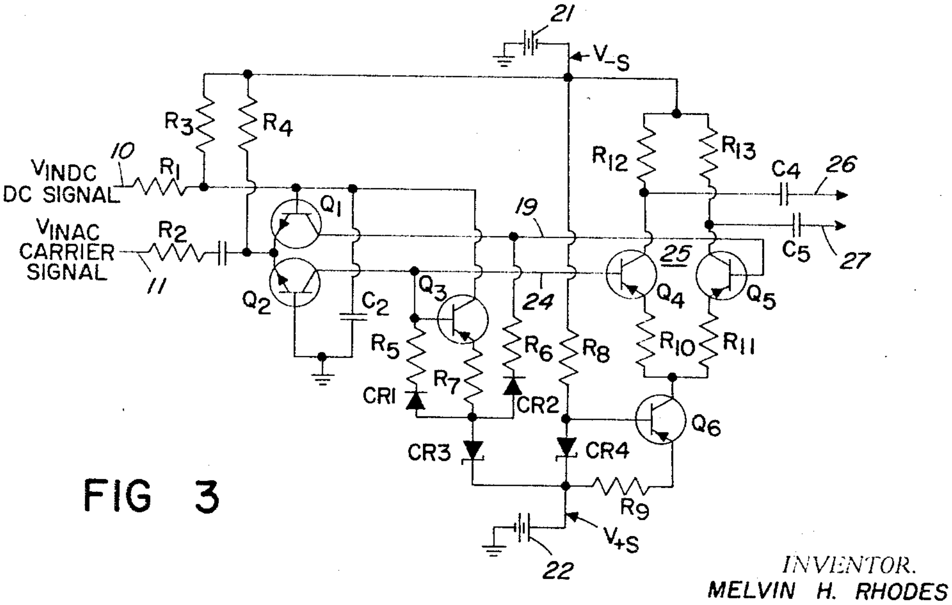

These and other objects and features of the present invention will become apparent upon reading the following description in conjunction with the accompanying drawings in which:

FIGURE 1 is a basic form of multiplier employing transistors in common base configuration to perform a generally logarithmic multiplication function;

FIGURE 2 is an embodiment of a linear analog multiplier in accordance with the present invention by means of which an input carrier signal may be multiplied linearly by a unipotential direct current signal; and FIGURE 3 is a further embodiment of an analog multiplier in accordance with the present invention whereby true analog linear multiplication of an input carrier signal by a D.C. signal of either polarity may be realized.

The general principle of the operation of the present invention considers the small signal operating characteristics of transistors as employed in common base amplifier configurations. The small signal input conductance $g_e$ of a common base transistor amplifier is very nearly proportional to the emitter bias current of the amplifier. When a bias current source and a carrier signal current source are connected in common with the emitters of two common base amplifiers, the ratio of the carrier current signals in the emitters will be the sum of the ratio of the emitter bias currents. The present invention generally then employs a means to control the ratio of the emitter bias currents from a direct current signal source since it can be shown that the collector current of the amplifiers employed in such a configuration is a product function of the carrier signal current applied to the emitter and the direct current signal employed to control the ratio of the emitter bias currents.

The operation of the present invention might best be comprehended by a consideration of the operation of a pair of transistors connected as common base amplifiers with the emitters connected in common to a constant current source. FIGURE 1 illustrates the basic configuration upon which the present invention is developed. With reference to FIGURE 1, a pair of transistors 12 and 13 are connected in common base configurations with the collector elements respectively connected through load resistances 17 and 18 to a positive supply source 16. The emitters of transistors 12 and 13 are connected in common through a resistor 14, designated $R_4$ to a negative supply source 15. The combination of $R_4$ and the negative source 15 comprise a high impedance constant current source. Each of the supply sources 15 and 16 is referenced to ground and the base of transistor 13 is likewise referenced. An input direct current signal 10, designated XDC is applied to the base of transistor 12 while an input carrier current or alternating current signal 11, designated YAC is applied in common with the constant current source to the common emitter junction. With the configuration of FIGURE 1, it can be shown that the magnitude of output 19 from the connector of transistor 13 is a function of the product of the input signal magnitudes, and output 19 is a carrier signal bearing a phase as determined by the input carrier signal YAC.

The basic operation of the arrangement of FIG. 1 may best be described by the following consideration of the transistor operating characteristics.

The input conductance of a transistor employed in a common base amplifier configuration for small emitter bias current (i.e., less than 1 ma.) is very nearly equal to:

$$g_e=\frac{I_{Eq}}{KT} \quad (1)$$

where:

$I_E$=Emitter bias current under 1 ma.
K=Boltzmann's constant
T=Degrees Kelvin
$q$=Charge of electron The input conductance for two common base amplifiers with emitters tied in common as in FIG. 1 (the conductance at the common emitter junction as seen by input 11) then becomes the sum of the two emitter conductances and may be expressed as:

$$g_e = g_{e_1} + g_{e_2} = \frac{I_{E_1}q}{KT} + \frac{I_{E_2}q}{KT} = (I_{E_1} + I_{E_2})\frac{q}{KT} \quad (2)$$

where the subscripts are referenced to the respective transistors $Q_1$ and $Q_2$. Reference to Expression 2 shows that the input conductance, is being the sum of the two conductances and thereby proportional to the sum of the two bias currents, will remain constant if the emitter bias carriers are differentially varied. The emitter currents will vary differentially if the bias is supplied from a constant current source.

The carrier current signal 11, when applied to the common emitter junction through a constant current source as illustrated in FIG. 1, will accordingly divide as the ratio of the individual input conductances to the total input conductance. The emitter carrier current signals $i_{e_1}$ and $i_{e_2}$ for the two transistors $Q_1$ and $Q_2$ may then be expressed as:

$$ie_1 = i_{ac}\frac{I_{E_1}\frac{q}{KT}}{(I_{E_1}+I_{E_2})\frac{q}{KT}} = i_{ac}\frac{I_{E1}}{I_{E_1}+I_{E_2}} \quad (3)$$

and $$i_{e_2} = i_{ac}\frac{I_{E_2}}{I_{E_1}+I_{E_2}} \quad (4)$$

where $i_{ac}$ is the input carrier current 11 of FIGURE 1.

Since the negative voltage source 15 and resistor 14 of FIGURE 1 constitute a constant current source from which the emitter bias current is furnished, a differential variation of the emitter bias currents is established such that $(I_{E_1}+I_{E_2})$ is a constant. Reference to Expressions 3 and 4, and bearing in mind that $(I_{E_1}+I_{E_2})$ is a constant, then shows that the emitter carrier signal current $i_{e_1}$ is proportional to $I_{E_1}$ and $i_{e_2}$ is proportional to $I_{E_2}$.

The collector currents for the transistors $Q_1$ and $Q_2$ may be expressed as:

$$i_{c_1} = \alpha_1 i_{e1} \quad (5)$$

and $$i_{c_2} = \alpha_2 i_{e2} \quad (6)$$

where $\alpha_1$ and $\alpha_2$ are the respectively small signal carrier transfer ratios of transistors $Q_1$ and $Q_2$.

The ratio of the DC component of the collector current to the DC emitter current for each of the transistors is equal to $\alpha_{DC}$, that is $$I_c/I_e = \alpha_{DC} \quad (7)$$

By substituting the $i_{e_1}$ as defined in Equation 3 for its equivalences in the Expression 8 and further replacing $i_{e_1}$ by its equivalences as expressed in Equation 5, the collector carrier current for transistor $Q_1$ may then be expressed as:

$$i_{c_1} = i_{ac}\cdot\alpha_1\frac{I_{E_1}}{I_{E_1}+I_{E_2}} = i_{ac}\alpha_1 K_1 I_{E_1} \quad (8)$$

where $K_1$ equals $$\frac{1}{I_{E_1}+I_{E_2}}$$

which in turn equals $R_4/V_{-s}$.

Expression 8 may then be rewritten, substituting therein the above relationship defining $K_1$ and the expression $I_{E_1}$ as expressed in Equation 7 as:

$$i_{c_1} = i_{ac}\alpha_1\frac{R_4}{V_{-s}}\cdot\frac{I_{c_1}}{\alpha_{DC_1}} \quad (9)$$

Similarly, the expression for collector carrier current of transistor $Q_2$ may be derived as being:

$$i_{c_2} = i_{ac}\alpha_2\frac{R_4}{V_{-s}}\cdot\frac{I_{c_2}}{\alpha_{DC}} \quad (10)$$

Expressions 9 and 10 are seen to equate the value of the collector currents of transistor $Q_1$ and $Q_2$ as being product functions of the input carrier current signal, the bias current and the DC component of the collector current. The values of $\alpha$ and $\alpha_{DC}$ for the two transistors very nearly approach unity for certain transistors. It may then be seen by assuming that $\alpha$ and $\alpha_{DC}$ are unity, the expressions for the collectors carrier currents for the two transistors reduce to functions which are proportional to the product of the input signal carrier current $i_{ac}$ and the direct current component of the respective collector currents, $I_{c_1}$ and $I_{c_2}$.

In accordance with the present invention, the DC component of the collector current $I_c$ will be controlled by another signal, the DC input signal 10 as applied to the base of transistor 12 of FIGURE 1.

In accordance with the present invention, the basic operating characteristics of a pair of grounded base amplifiers with common emitter configuration together with appropriate feedback means may comprise a linear analog multiplier.

A first embodiment is illustrated in FIG. 2 in the form of what will be termed a two-quadrant multiplier—i.e., a multiplier producing a carrier frequency output signal which might characteristically be in or out of phase with a reference, with the magnitude of the carrier output signal being a linear function of a variable DC input signal of one particular polarity. In the embodiment to be described, the DC input signal may vary from zero to some predetermined positive voltage. This application is analogous to applying a carrier signal to a linear potentiometer the wiper position of which determines the magnitude of the output signal such that the magnitude may be varied from zero to a maximum. The embodiment of FIG. 2 electronically effects the wiper arm positioning of the potentiometer analogy.

With reference to FIGURE 2, the emitter of transistors $Q_1$ and $Q_2$ are seen to be connected, as in FIGURE 1, through a common emitter resistor $R_4$ to a negative source $V_{-s}$. The collectors of transistors $Q_1$ and $Q_2$ are returned through respective load resistors $R_6$ and $R_5$ and associated diodes $CR_2$ and $CR_1$ to a positive supply source $V_{+s}$. An output 19 is taken from the collector of transistor $Q_1$. The DC input signal 10 is applied through a resistor $R_1$ to the base of transistor $Q_1$. The DC input signal 11 is applied through resistor $R_2$ and capacitor $C_1$ to the common emitter connection of transistors $Q_1$ and $Q_2$. The base of transistor $Q_1$ is connected through resistors $R_3$ to the negative bias voltage source $V_{-s}$. A direct current feedback arrangement is connected between the collector output of transistor $Q_2$ and the input terminal or base of transistor $Q_1$. This feedback path comprises a further transistor $Q_3$ the emitter of which is returned through a resistor $R_7$ to the positive voltage source $V_{+s}$, the collector of which is connected to the base of transistor $Q_1$, and the base of which is connected to the collector of transistor $Q_2$.

Resistor $R_4$ and the negative voltage source $V_{-s}$ provide the direct current bias constant current source to the emitters of transistors $Q_1$ and $Q_2$. Resistors $R_2$ and the input carrier signal 11 provide the current source for the carrier input signal. Resistors $R_3$ and the negative voltage source $V_{-s}$ provide the bias current to the base of transistor $Q_1$. Resistor $R_1$ and the direct current input signal 11 provide the current source for the direct current input signal. The capacitor $C_2$ functions as a carrier current bypass capacitor for the base of transistor $Q_1$.

The further transistor $Q_3$ and its emitter load resistor $R_7$ form a direct current amplifier. The DC collector current of transistor $Q_3$ is proportional to the collector current of transistor $Q_2$ by a relationship which may be expressed as follows:

$$I_{c_3}=\frac{R_5}{R_7}\alpha_{DC_3}I_{c_2} \qquad (11)$$

The DC collector current of the transistor $Q_1$ may be expressed as:

$$I_{c_1}=\frac{\alpha_1}{1-\alpha_1}\left[\frac{V_{INDC}}{R_1}-\frac{V_{-s}}{R_3}+I_{c_2}\frac{R_5}{R_7}\alpha_{DC_3}\right] \qquad (12)$$

The emitter current of transistor $Q_2$ may be expressed as the total emitter current as determined by the constant current source minus the emitter current of $Q_1$ as follows:

$$I_{E_2}=\frac{V_{-s}}{R_4}-I_{E_1} \qquad (13)$$

A close approximation for direct current collector current $I_{C_2}$ of transistor $Q_2$ for a value of $\alpha_{DC}$ greater than 0.99 may be expressed as:

$$I_{c_2}=\frac{V_{-s}}{R_4}-I_{c_1} \qquad (14)$$

Substitution of the expression for the direct current collector current of the transistor $Q_2$ as expressed in (14) into the Expression 12 arrives at the following expression for the DC collector current of transistor $Q_1$:

$$I_{c_1}=\frac{R_7\alpha_{DC_1}}{R_7\left(\frac{1-\alpha_{DC_1}}{\alpha_{DC_1}}\right)+R_5\alpha_{DC_3}}\left[\frac{V_{INDC}}{R_1}-V_{-s}\left(\frac{1}{R_3}-\frac{R_5\alpha_3}{R_4R_7}\right)\right] \qquad (15)$$

If the value of $R_3$ is then selected to make the value of the collector current of transistor $Q_1$ as expressed in (15) equal to zero for a condition of zero input direct current signal 10, then $$\frac{1}{R_3}-\frac{R_5\,\alpha_3}{R_4R_7}=0 \qquad (16)$$

Under these conditions the collector current of transistor $Q_1$ as a function of input DC voltage $V_{INDC}$ will be:

$$I_{c_1}=\alpha_1\frac{V_{INDC}}{R_1}\left[\frac{R_7}{R_7(1-\alpha_{DC_1})+R_5\alpha_{DC_3}}\right] \qquad (17)$$

By substituting the expression for the collector current of transistor $Q_1$ are expressed in (17) into the relationship defined in Expression 9 will result in the following relationship:

$$i_{c_1}=i_{ac}\cdot\frac{R_4}{V_{-s}}\alpha_{DC_1}\frac{V_{INDC}}{R_1}\left[\frac{R_7}{R_7(1-\alpha_{DC_1})+R_5\alpha_{DC_3}}\right] \qquad (18)$$

Since the input carrier signal $i_{ac}$ may be expressed as the ratio of the input carrier signal voltage defined by resistor $R_2$ as:

$$i_{ac}=\frac{V_{INAC}}{R_2} \qquad (19)$$

A substitution of the expression for the input carrier current from (19) into Expression 18 results in the following relationship:

$$i_{c_1}=\frac{V_{INAC}}{R_2}\cdot\frac{V_{INDC}}{R_1}\left[\frac{R_7}{R_7(1-\alpha_{DC_1})+R_5\alpha_{DC_3}}\right]\frac{R_4}{V_{-s}}\alpha_{DC_1} \qquad (20)$$

By examination of Expression 20 it is seen that if $R_7$ is made equal to $R_5$ and assuming values of $\alpha_{1_{DC}}$ and $\alpha_{3_{DC}}$ nearly equal to unity, the following relationship is true:

$$\frac{R_7}{R_7(1-\alpha_{DC_1})+R_5\alpha_{DC_3}}\cong 1 \qquad (21)$$

The expression for the collector current of transistor $Q_1$ is then seen to be proportional to products of the input AC signal and the input DC signal times the ratio of $R_4$ to $V_{-s}$. If then, the negative voltage source $V_{-s}$ is held constant, the Expression 20 reduces to a relationship showing that the collector signal current of transistor $Q_1$ is directly proportional to the product of the two input signals. The desired linear relationship is seen to be effected by choosing the value of $R_3$ to effect a particular biasing for zero DC input signal and by making $R_7$ equal to $R_5$. The latter relationship is realized more precisely by the inclusion of diode $CR_1$ in series with resistor $R_5$ between the base of transistor $Q_3$ and the positive voltage source $V_{+s}$. The junction resistance of diode $CR_1$ may be made equal to the emitter-base junction resistance of transistor $Q_3$. In a more precise arrangement (not illustrated) the function of diode $CR_1$ might be more exactly effected by inserting in place of the diode the actual emitter-base junction of a further transistor identical to transistor $Q_3$. With this latter arrangement, the voltage drop across $R_7$ may be made even more precisely equal to that across resistor $R_5$, which is the desired condition for assuring that the collector current is a linear function of input DC signal 10.

The output 20 of the two quadrant multiplier configuration of FIGURE 2 is coupled from the collector of transistor $Q_1$ by means of a capacitor $C_3$. The collector current of transistor $Q_1$ has been shown to be a linear function of the product of the input signals 10 and 11. The output voltage of the configuration of FIGURE 2 will be the product of the collector current of transistor $Q_1$ and the collector load resistance $R_6$. Due to the differential action of the transistors $Q_1$ and $Q_2$ and the manner in which they were biased by choice of resistor $R_3$ such that the collector current of transistor $Q_1$ is zero when the DC input was zero, the output collector current of transistor $Q_2$ bears also a product relationship to the direct current and carrier current input signals. The collector current of transistor $Q_2$ may be shown to be equal to $i_{ec}(1-V_{DC}K)$. This relationship is established since the collector current of transistor $Q_1$, by choice of bias arrangement, was chosen to be zero with zero input DC signal whereby transistor $Q_2$ under this condition would not exhibit zero collector current, but rather a maximum collector current. Depending upon a particular desired usage, an output might be taken from either of the collectors of transistors $Q_1$ and $Q_2$, each output being a linear function of the product of the input signals 10 and 11.

The embodiment of FIGURE 2 was described as a functioning to multiply an input carrier signal by an input DC signal, the latter being a unipotential signal variable from zero to a predetermined maximum. Since, in many applications, the input signal might be of one phase or the other with respect to some reference, the embodiment of FIGURE 2 was determined as a two-quadrant multiplier.

For certain applications the need arises for a linear multiplier circuitry to produce the product of a carrier signal and a DC signal where the carrier might be either zero phase or 180° phase compared to a reference and the DC signal may vary through zero between some predetermined positive and negative magnitudes. While the embodiment of FIGURE 2 was described as being analogous to a potentiometer operation on an input carrier signal, a further embodiment will now be described which might be termed a four-quadrant multiplier. The operation of the four-quadrant multiplier to be described is analogous to the action of a potentiometer being placed across a center-tapped secondary winding of a transformer to which an AC carrier signal is applied as primary input. Again, the position of the potentiometer wiper arm is controlled electronically. In a zero, or center "position" the output is zero. With a preliminary input defined as $1<0^\circ$ the output is accordingly variable from zero to respective maximums defined as $+1<0°$ and $-1<0°$.

The four-quadrant multiplier to be described is basically an extension of the two-quadrant multiplier of FIGURE 2. Due to the differential action of the two-quadrant embodiment previously described, the four-quadrant multiplier, as shown schematically in FIGURE 3, applied the output from each of the collectors of the transistors $Q_1$ and $Q_2$, to a differential amplifier having high common mode rejection. The particular biasing arrangement for the two common base amplifiers will be shown to be uniquely different from that of the previous embodiment and the desired linearity will incorporate a particular value of the load resistor $R_6$ for transistor $Q_1$ in terms of the other circuit parameters.

The four-quadrant multiplier as embodied in FIGURE 3 is seen to be comprised of transistors $Q_1$, $Q_2$, and $Q_3$ in a circuit configuration like that of the previous embodiment of FIGURE 2 with the exception that the load resistor $R_7$ for $Q_3$ is returned through a Zener diode reference to the positive supply source $V_{+s}$. The outputs 19 and 24 from transistors $Q_1$ and $Q_2$ are applied as respective inputs to the bases of further transistors $Q_4$ and $Q_5$. Transistors $Q_4$ and $Q_5$ are employed in a differential amplifier 25. An analysis of the circuitry will show that the outputs 26 and 27 from the collectors of transistors $Q_4$ and $Q_5$ of the differential amplifier are each linearly proportional to the product of the DC input signal 10 and the AC carrier input carrier signal 11. In this instance, the phase of the two outputs 26 and 27 will be opposite.

The differential amplifier 25 of FIGURE 3 comprises transistors $Q_4$ and $Q_5$ the emitter of which are connected through respective resistors $R_{10}$ and $R_{11}$ a constant carrier source. The constant carrier source is illustrated as comprising a further transistor $Q_6$ the collector-emitter junction of which is serially connected with a resistor $R_9$ between the junction of resistors $R_{10}$ and $R_{11}$ and the positive direct current source $V_{+s}$. The base of transistor $Q_6$ is returned to a reference potential at the junction between a resistor $R_8$ and Zener diode $CR_4$ the latter being respectively serially connected between the negative voltage source $V_{-s}$ and the positive voltage source $V_{+s}$. Transistor $Q_6$ resistors $R_8$ and $R_9$ and Zener diode $CR_4$ form a high impedance bias current source for the differential amplifier 25. The particular biasing arrangement embodied in FIGURE 3 is a means for providing high common mode rejection for the differential amplifier 25. It is to be understood that transistor $Q_6$ and its associated circuitry might be replaced by a large resistance connected between the positive voltage source $V_{+s}$ at the junction of the emitter-resistors $R_{10}$ and $R_{11}$. The employment of the further resistor $Q_6$ in the constant current source functions in a known manner to allow a physically smaller value of $R_9$ to realize the desired high impedance. In effect the value of $R_9$ is multiplied by transistor $Q_6$ and associated circuitry.

The further Zener diode $CR_3$ connected between resistor $R_7$ and the positive voltage source $V_{-s}$ is employed to attain correct biasing by assuring that the voltage at the junction of diodes $CR_1$ and $CR_2$ is less positive than that on the collector of transistor $Q_6$.

While the previous embodiment including biasing of the transistor pair $Q_4$ and $Q_5$, by choice of $R_3$ such that the direct current collector current of $Q_1$ was zero with zero input DC signal, the embodiment of FIGURE 3 employs a value of $R_3$ such that the DC collector of both $Q_1$ and $Q_2$ are zero for zero input DC signal 10.

The output from the differential amplifier 25 is, by definition, proportional to the difference between the input signals. In the embodiment of FIGURE 3, the output from differential amplifier is accordingly proportional to the difference between the input voltages at the bases of transistors $Q_4$ and $Q_5$.

The following analysis may then be made of the operational characteristics based on the expressions of the two carrier signal voltages as applied to the bases of $Q_4$ and $Q_5$.

The carrier signal voltage at the base of transistor $Q_5$ is the product ${}_{c1}\times R_6$. The carrier signal voltage at the base of transistor $Q_4$ may be expressed as:

$$i_{c_2}\left[\frac{R_5(h_{f_{e3}}+1)R_7}{R_5+(h_{f_{e3}}+1)R_7}\right]$$

where $h_{fe3}$ is the AC current gain of transistor $Q_3$ (the ratio of the AC collector current of $Q_3$ to the base current).

If resistor $R_6$ is made equal to the above expression for the carrier signal voltage at the base of transistor $Q_4$, then the difference between the base voltages of transistors $Q_4$ and $Q_5$ can be shown to be proportional to the difference between the carrier component collector currents of transistors $Q_1$ and $Q_2$ that is proportional to $(i_{c1}-i_{c2})$.

With the above defined relationship between $R_6$ and $R_5$, and $R_7$, the output from the differential amplifier is proportional to $(i_{c1}-i_{c2})$. An expression for $i_{c1}-i_{c2}$ may be developed as follows.

The collector carrier current of transistor $Q_1$ and $Q_2$ were previously expressed (see (8) and (9)) as:

$$i_{c_1}=\frac{V_{\mathrm{INAC}}}{R_2}\cdot\frac{I_{c_1}}{V_{-s}}\cdot R_4 \qquad (22)$$

and $$i_{c_2}=\frac{V_{\mathrm{INAC}}}{R_3}\cdot\frac{I_{c_2}}{V_{-s}}\cdot R_4 \qquad (23)$$

The difference between the carrier component collector currents of transistor $Q_1$ and $Q_2$ may then be expressed in terms of the relationship of Expressions 22 and 23 as:

$$(i_{c_1}-i_{c_2})=\frac{V_{\mathrm{INAC}}}{R_2}\cdot\frac{R_4}{V_{-s}}(I_{c_1}-I_{c_2}) \qquad (24)$$

The substitution of the expression for $I_{c_2}$ in Equation 14 into 24 arrives at the following relationship:

$$(i_{c_1}-i_{c_2})=\frac{V_{\mathrm{INAC}}}{R_2}\left[\frac{R_4}{V_{-s}}(2I_{c_1}-1)\right] \qquad (25)$$

The substitution for expression for $I_{c1}$ as defined in Equation 15 into Expression 25 arrives at:

$$(i_{c_1}-i_{c_2})=\frac{V_{\mathrm{INAC}}}{R_2}\cdot\frac{V_{\mathrm{INDC}}}{R_1}\left[\frac{R_7\alpha_{\mathrm{DC}_1}}{R_7\left(\frac{1-\alpha_{\mathrm{DC}_1}}{\alpha_{\mathrm{DC}_1}}\right)+R_5\alpha_{\mathrm{DC}_3}}\right]\frac{2R_4}{V_{-s}}-\frac{V_{\mathrm{INAC}}}{R_2}\left(\frac{2R_4}{R_3}-\frac{R_5}{R_7}\alpha_3+1\right) \qquad (26)$$

By making the last term in Expression 26

$$\left[\frac{2R_4}{R_3}-\frac{R_5}{R_7}\alpha_3+1\right]$$

equal to zero, the difference between the carrier component collector currents of transistors $Q_1$ and $Q_2$ may be expressed as:

$$i_{c_1}-i_{c_2}=\frac{V_{\mathrm{INAC}}}{R_2}\cdot\frac{V_{\mathrm{INDC}}}{R_1}\left[\frac{R_7\alpha_{\mathrm{DC}_1}}{R_7\left(\frac{1-\alpha_{\mathrm{DC}_1}}{\alpha_{\mathrm{DC}_1}}\right)+R_5\alpha_{\mathrm{DC}_3}}\right]\frac{2R_4}{V_{-s}} \qquad (27)$$

Considering the above Expression 27, since $V_{-s}$ is a supply voltage which is held constant, $2R_4/2V_{-s}$ may be considered a constant $K_1$.

Expression 27 then reduces to:

$$i_{c_1}-i_{c_2}=\frac{V_{\mathrm{INAC}}}{R_2}\cdot\frac{V_{\mathrm{INAC}}}{R_1}K_1K_2 \qquad (28)$$

$$K_2=\left[\frac{R_7\alpha_{DC_1}}{R_7\left(\frac{1-\alpha_{DC_1}}{\alpha_{DC_1}}\right)+R_5\alpha_{DC_3}}\right]$$

The output of the differential amplifier 25 as expressed in 28 is seen proportional to the produce of two expressions which define the input carrier current and input DC current respectively to the multiplier. Since the collector currents of the transistors $Q_4$ and $Q_5$ employed in the differential amplifier 25 vary, by definition, in a differential manner, output 26 and output 27, as taken from the respective collectors of the differential amplifier, are seen, with reference to Expression 28, to imply a phase reversal. Either of the outputs 26 or 27 is linearly proportional to the product of the input AC and DC signals.

Although the present invention has been described with respect to a particular embodiment thereof it is not to be so limited that changes may be made therein which fall within the scope of the invention as defined by the appended claims.

I claim:

1. Circuit means for effecting linear multiplication of first and second input signals, said first signal comprising a direct current signal, said second signal comprising an alternating current carrier signal, the outputs from said circuitry comprising a carrier signal the magnitude of which is a linear function of said direct current input signal; said circuitry comprising first and second transistors each connected in a common base amplifier configuration, the emitters of each of said transistors being connected in common to a constant current source, carrier current bypass means connected between the respective bases of said first and second transistors, the collectors of each of said transistors connected respectively through first and second load resistors to a supply voltage source, said direct current input signal being applied to the base of said first transistor, said alternating current carrier input signal being connected in common to the emitters of each of said first and second transistors, direct current feedback means connected between the collector of said second transistor to the base of said first transistor whereby the collector current of said second transistor is a linear function of said input direct current signal, means for biasing said first transistor for zero carrier component collector current when said input direct current signal is zero, an output taken from the collector of one of said first and second transistors, said output being proportional to the product of said alternating current carrier input signal and said direct current input signal.

2. Circuitry as defined in claim 1 wherein said direct current feedback means comprises a third transistor the base of which is connected to the collector of said second transistor, the emitter of said third transistor being connected through a load resistor to said supply voltage source, the collector of said third transistor being connected to the base of said first transistor, said load resistor associated with the first and third transistors being selected in value such that the voltage drop across each of said resistors is substantially equal, whereby the collector current of said third transistor is linearly proportional to that of said second transistor.

3. Circuitry as defined in claim 2 wherein said constant current source comprises further supply voltage source serially connected to each of the emitters of said first and second transistors through a common high impedance resistor.

4. Circuitry as defined in claim 2 further comprising a diode serially connected between the load resistor associated with said second transistor and said direct current supply source, said diode exhibiting a junction resistance substantially equal that of the emitter-base junction of said third transistor.

5. Signal multiplying means as defined in claim 1 wherein said input direct current signal may be of positive or negative polarity, said biasing means effecting zero carrier component of collector current in each of said first and second transistors when said direct current input signal is zero, a differential amplifier comprising first and second input terminals and being adapted to produce an output proportional to the algebraic difference between input signals applied to said input terminals, the collectors of said first and second transistors connected respectively to the first and escond input terminals of said differential amplifier, and an output taken from said differential amplifier, said output being linearly proportional to the product of said alternating current carrier input signal and said direct current input signal.

6. Signal multiplying means as defined in claim 5 wherein said direct current feedback means comprises a third transistor the base of which is connected to the collector of said second transistor, the emitter of said third transistor being connected through a load resistor to said supply voltage source, the collector of said third transistor being connected to the base of said first transistor, said load resistor associated with the first and third transistors being selected in value such that the voltage drop across each of said resistors is substantially equal, whereby the collector current of said third transistor is linearly proporitonal to that of said second transistor.

7. Signal multiplying means as defined in claim 6 wherein said constant current source comprises a further supply voltage source serially connected to each of the emitters of said first and second transistors through a common high impedance resistor.

8. Circuitry as defined in claim 7 wherein the load resistors associated with the collectors of said first and second transistors are serially connected to the said supply voltage source through further diode, the junction resistances of said further diodes being substantially equal that of the emitter-base junction of said third transistor.

9. Circuitry as defined in claim 8 wherein said differential amplifier comprises fourth and fifth transistors the emitters of which are returned through like resistors to said supply voltage source, the collectors of said fourth and fifth transistors being connected through like resistors to a further consant current source, the first and second input terminals of said differential amplifier comprising the respective bases of said fourth and fifth transistors, and an output terminal connected to the collector of one of said fourth and fifth transistors, said output being linearly proportional to the product of said alternating current carrier input signal and said direct current signal.

10. Circuitry as defined in claim 9 wherein said further constant current source comprises a sixth transistor the emitter-collector terminals of which are connected to the common connection of the emitters of said fourth and fifth transistors through a further high impedance resistor to a further supply voltage source, a Zener diode and further resistor respectively serially connected between said voltage supply source and said further supply source and the base of said sixth transistor being connected to the junction of said Zener diode and said further resistor.

11. Circuitry as defined in claim 10 wherein first and second output terminals are connected respectively to the collectors of said fourth and fifth transistors, the output from said first and second terminal being linearly proportional in magnitude to the product of said alternating current carrier input signal and said direct current input signal being respectively in phase and out of phase with said alternating current carrier input signal.

References Cited

UNITED STATES PATENTS

| | | | |
|---|---|---|---|
| 3,304,419 | 2/1967 | Huntley et al. | 307—229 X |
| 3,353,012 | 11/1967 | Baude | 328—160 X |

DONALD D. FORRER, *Primary Examiner.*

U.S. Cl. X.R.

235—194; 328—160